US010379641B2

(12) United States Patent
Lim et al.

(10) Patent No.: US 10,379,641 B2
(45) Date of Patent: Aug. 13, 2019

(54) TOUCH SCREEN APPARATUS HAVING ADDITIONAL SENSING ELECTRODE LOCATED IN NON-ACTIVE AREA

(71) Applicant: Samsung Display Co., Ltd., Yongin-si (KR)

(72) Inventors: Sang Hyun Lim, Yongin-si (KR); Chang Sub Jung, Yongin-si (KR); A Ra Jo, Yongin-si (KR); Jae Woo Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/647,110

(22) Filed: Jul. 11, 2017

(65) Prior Publication Data

US 2018/0018029 A1 Jan. 18, 2018

(30) Foreign Application Priority Data

Jul. 12, 2016 (KR) ........................ 10-2016-0088210

(51) Int. Cl.
*G06F 3/044* (2006.01)
*G06F 3/038* (2013.01)
(Continued)

(52) U.S. Cl.
CPC ........ *G06F 3/0383* (2013.01); *G06F 3/03545* (2013.01); *G06F 3/044* (2013.01);
(Continued)

(58) Field of Classification Search
CPC ...... G06F 3/0412; G06F 3/0416; G06F 3/044; G06F 3/0383; G06F 3/03545;
(Continued)

(56) References Cited

U.S. PATENT DOCUMENTS 9,411,479 B2 8/2016 Kim et al.
2015/0084912 A1* 3/2015 Seo ........................ G06F 3/0412 345/174
(Continued)

FOREIGN PATENT DOCUMENTS

KR 10-1478043 1/2015
KR 10-2015-0116932 10/2015
(Continued)

OTHER PUBLICATIONS

US 9,629,235 B2, 04/2017, Kim et al. (withdrawn)

*Primary Examiner* — Jennifer Mehmood
*Assistant Examiner* — James S Nokham
(74) *Attorney, Agent, or Firm* — H.C. Park & Associates, PLC

(57) ABSTRACT

A touch screen apparatus includes: an active area and a non-active area outside the active area; first sensing electrodes arranged along a first direction in the active area; second sensing electrodes arranged along a second direction intersecting the first direction in the active area, the second sensing electrodes being insulated from the first sensing electrodes; and at least one additional sensing electrode separated from the first and second sensing electrodes, the at least one additional sensing electrode being located in the non-active area.

15 Claims, 5 Drawing Sheets

(51) Int. Cl.
*G06F 3/0354* (2013.01)
*G06F 3/041* (2006.01)

(52) U.S. Cl.
CPC .. *G06F 3/0416* (2013.01); *G06F 2203/04111* (2013.01); *G06F 2203/04112* (2013.01)

(58) Field of Classification Search
CPC ... G06F 2203/0411; G06F 2203/04112; G02F 1/1368; G02F 1/134336
See application file for complete search history.

(56) References Cited

U.S. PATENT DOCUMENTS

| | | | | |
|---|---|---|---|---|
| 2016/0018915 | A1* | 1/2016 | Kuo | G06F 3/0416 345/173 |
| 2016/0048224 | A1 | 2/2016 | Brunet et al. | |
| 2016/0124563 | A1* | 5/2016 | Wang | G06F 3/0416 345/174 |
| 2016/0178974 | A1* | 6/2016 | Li | G02F 1/134336 345/174 |
| 2016/0370904 | A1* | 12/2016 | Wang | G06F 3/0416 |
| 2017/0308200 | A1* | 10/2017 | Mugiraneza | G06F 3/044 |

FOREIGN PATENT DOCUMENTS

| | | |
|---|---|---|
| KR | 10-2016-0000242 | 1/2016 |
| KR | 10-2016-0031295 | 3/2016 |

* cited by examiner

TOUCH SCREEN APPARATUS HAVING ADDITIONAL SENSING ELECTRODE LOCATED IN NON-ACTIVE AREA

CROSS-REFERENCE TO RELATED APPLICATIONS

This application claims priority from Korean Patent Application No. 10-2016-0088210, filed on Jul. 12, 2016, which is hereby incorporated by reference for all purposes as if fully set forth herein.

BACKGROUND

Field

The invention relates generally to a touch screen apparatus, and more particularly, to a touch screen apparatus capable of improving the accuracy of touch recognition at an outer portion of the active area of the touch screen.

Discussion of the Background

A touch screen apparatus is an input apparatus that enables a user command to be input of a user by selecting instructional content displayed on a screen of a display device or the like with the user's hand or an object, such as a touch pen or stylus. Since such a touch screen apparatus can be substituted for a separate input apparatus connected to a display device, such as a keyboard or mouse, applications and uses of touch screens have been gradually increased.

There are known various methods of implementing touch screen apparatuses, including a resistive layer method, an optical sensing method, an electrostatic capacitance method, and the like. A touch screen apparatus using the electrostatic capacitance method senses a change in capacitance formed by a conductive sensing electrode along with another adjacent sensing electrode, a ground electrode, or the like when a finger of a user or a touch pen is in contact therewith, so that a touch position is determined by analyzing an electrical signal corresponding to the contact position.

In particular, in a touch input method using a touch pen, a minute input can be applied as compared with an input applied by a finger. Thus, the touch input method is appropriate to perform graphic operations such as writing, sketching, and minute drawing.

The above information disclosed in this Background section is only for enhancement of understanding of the background of the inventive concepts, and, therefore, it may contain information that does not form the prior art that is already known to a person of ordinary skill in the art.

SUMMARY

Applicants have discovered that when a touch occurs at an outer portion of the active area, the intensities of sensing signals from the sensing electrodes disposed in the active area are weak, so that it is difficult to determine a touch position accurately using only the sensing electrodes. Apparatus constructed according to the principles of the invention may improve accuracy of touch recognition at an outer portion of the active area. For example, exemplary apparatus constructed according to the principles of the invention may have at least one additional sensing electrode separated from the sensing electrodes disposed in the active area.

Additional aspects will be set forth in the detailed description which follows, and, in part, will be apparent from the disclosure, or may be learned by practice of the inventive concepts.

According to one aspect of the invention, a touch screen apparatus includes an active area and a non-active area outside the active area; first sensing electrodes arranged along a first direction in the active area; second sensing electrodes arranged along a second direction intersecting the first direction in the active area, the second sensing electrodes being insulated from the first sensing electrodes; and at least one additional sensing electrode separated from the first and second sensing electrodes, the at least one additional sensing electrode being located in the non-active area.

The touch screen apparatus may further include an active touch pen that generates a driving signal for a touch input. The touch screen apparatus may further include a touch controller that determines a touch position, based on a sensing signal provided from the additional sensing electrode, the sensing signal corresponding to the driving signal.

The touch screen apparatus may further include connection lines for connecting each of the first sensing electrodes, the second sensing electrodes, and the additional sensing electrode to the touch controller. The additional sensing electrode may be located outwardly from the connection lines.

The additional sensing electrode may be located between the connection lines. A portion of the additional sensing electrode may overlap with a portion of at least one of the connection lines. An insulating layer may be provided between the portion of the additional sensing electrode and the connection lines which overlap each other.

The first sensing electrodes, the second sensing electrodes, and the additional sensing electrode may be formed on a first substrate of a display panel. The active area may include a display area of the display panel, and the non-active area may include a non-display area of the display panel.

The additional sensing electrode may overlap with an area in which a seal member sealing the first substrate and a second substrate is located. The first sensing electrodes, the second sensing electrodes, and the additional sensing electrode may be formed of a transparent electrode material.

The additional sensing electrode may have a substantially bar-like shape extending along one side of the non-active area. The additional sensing electrode may have a width narrower than that of the first and second sensing electrodes.

The additional sensing electrode the additional sensing electrode may include at least one first additional electrode arranged in parallel to the first sensing electrodes, and at least one second additional electrode arranged in parallel to the second sensing electrodes. The first and second additional sensing electrodes may surround the outer periphery of the active area. The first and second additional sensing electrodes may substantially surround the outer periphery of the active area. The at least one additional sensing electrode may be separated from the first and second sensing electrodes in a plan view.

Additional features of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1A:
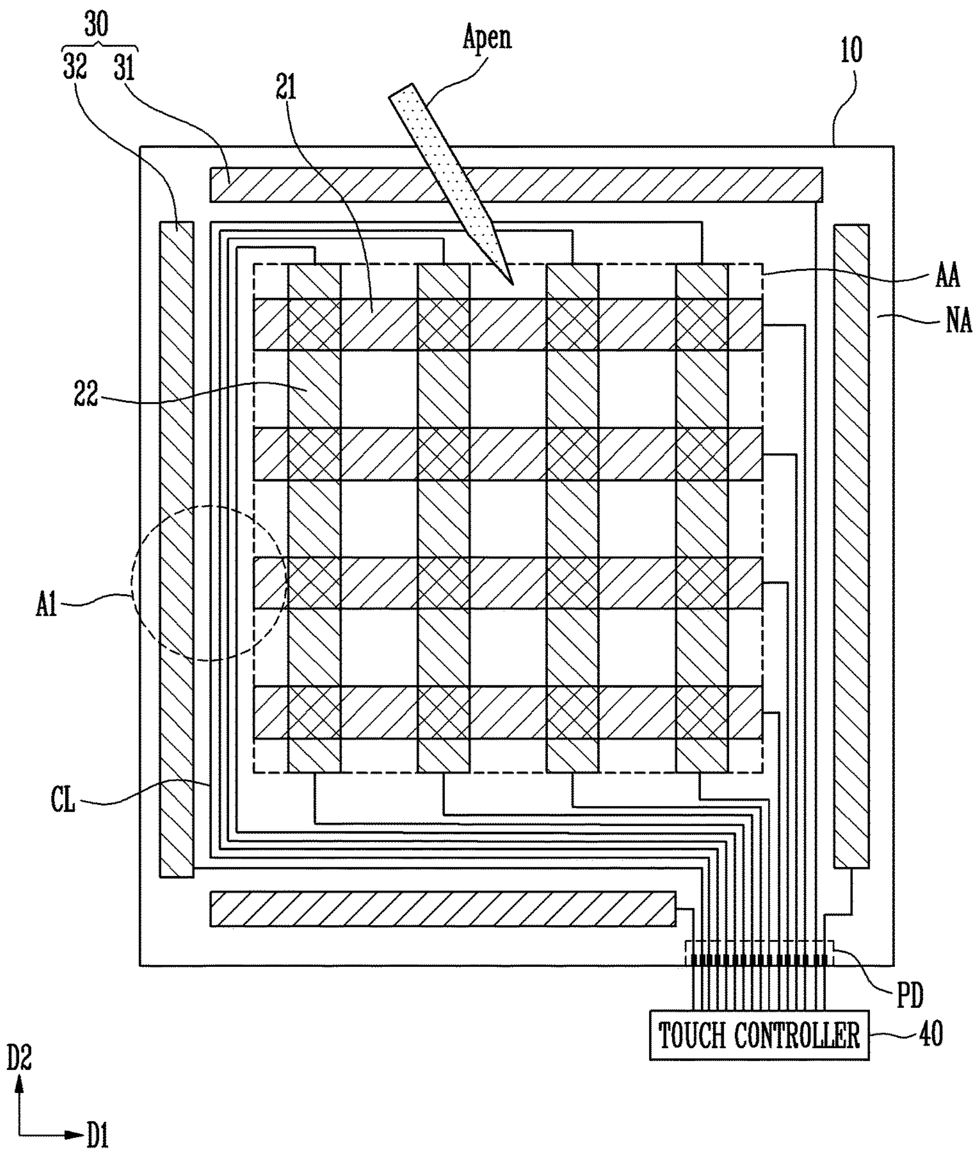
FIG. 1A is a plan view of an exemplary touch screen apparatus constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the x-axis, the y-axis, and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1B:
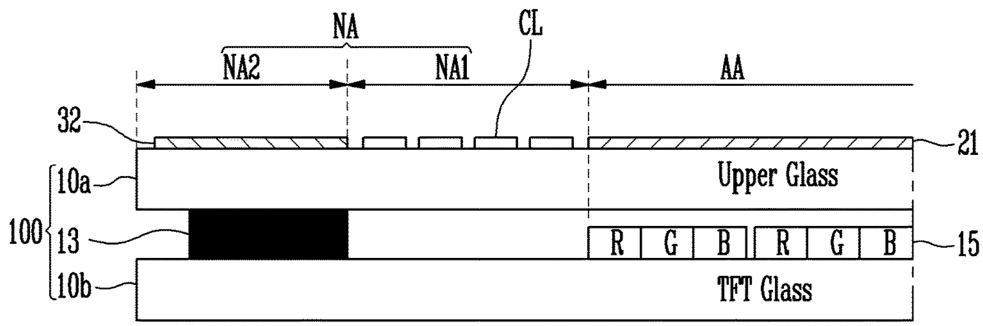
FIGS. 1B and 1C are partial cross-sectional views of area A1 of FIG. 1A.
Figure 1C:
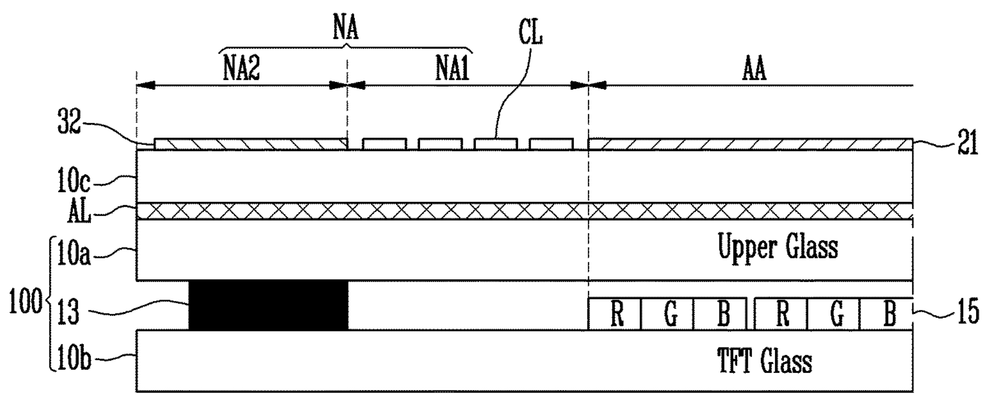

FIG. 1A is a plan view of an exemplary touch screen apparatus constructed according to the principles of the invention. FIGS. 1B and 1C are partial cross-sectional views of area A1 of FIG. 1A.

First, referring to FIG. 1A, the touch screen apparatus may include an active touch pen Apen, a substrate 10, first sensing electrodes 21, second sensing electrodes 22, an additional sensing electrode 30, connection lines CL, and a touch controller 40.

The active touch pen Apen may be equipped with a circuit that generates a driving signal for a touch input. The active touch pen Apen may have a shape substantially in the form of a writing instrument, such as a fountain pen. One end portion of the active touch pen Apen is a part that is configured to contact a touch screen, and may have a cone shape having a sharp tip.

The substrate 10 may be made of a transparent insulating material. The substrate 10 may be made of various materials such as glass, polymer, and metal. The substrate 10 may be provided in various shapes, and the material constituting the substrate 10 is not particularly limited.

The substrate 10 may be divided into an active area AA in which a touch input is performed, and a non-active area NA located at the outside of the active area AA, the non-active area NA is an area in which the touch input is not performed.

The first and second sensing electrodes 21 and 22 are conductive patterns for sensing a touch input, and may be uniformly distributed and arranged in the active area AA. The first sensing electrodes 21 are arranged along a first direction D1, and the second sensing electrodes 22 are arranged along a second direction D2 intersecting the first direction D1.

The first and second sensing electrodes 21 and 22 may be provided in various shapes, e.g., a polygonal shape including a bar shape, a diamond shape, and the like, or a circular shape. Also, the first and second sensing electrodes 21 and 22 may be formed of a transparent electrode material to enable light to be transmitted therethrough. In an embodiment, the first and second sensing electrodes 21 and 22 may be made of a transparent conductive material such as indium tin oxide (ITO), indium zinc oxide (IZO), or antimony zinc oxide (AZO).

In this embodiment, a striped structure in which each of the first and second sensing electrodes 21 and 22 have a bar shape and are spaced apart from each other at a predetermined distance is illustrated as an example. However, the disclosure is not limited thereto, and the structure of the first and second sensing electrodes 21 and 22 may be selected from the shape, structure, and material of various conductive patterns known in the art.

For example, the first and second sensing electrodes 21 and 22 may be provided in a mesh form having a structure in which a plurality of conductive lines intersect one another. In this case, the first and second sensing electrodes 21 and 22 may be made of a conductive metallic material or a conductive nano compound such as a silver nano wire (AgNW), a carbon nano tube (CNT), or graphene.

The additional sensing electrode 30 may be at least one conductive pattern separated from the first and second sensing electrodes 21 and 22, and the at least one conductive pattern may be located in the non-active area NA. In an embodiment, the additional sensing electrodes 30 may be located in the non-active area NA in a position avoiding the connection lines CL so as not to overlap with each other. The additional sensing electrode 30 may have a structure that is disposed at a portion of the outer periphery of the active area AA to generally surround the active area AA. The additional sensing electrode 30 may have a bar shape that extends along one side of the non-active area NA and has a predetermined width. The additional sensing electrode 30 may have a width narrower than that of the first and second sensing electrodes 21 and 22.

In an embodiment, the additional sensing electrode 30 may include first additional sensing electrodes 31 arranged in parallel to the first sensing electrodes 21, and second additional sensing electrodes 32 arranged in parallel to the second sensing electrodes 22. For example, two first additional sensing electrodes 31 may be symmetrically disposed at upper and lower sides of the non-active area NA, respectively, and two second additional sensing electrodes 32 may be symmetrically disposed at left and right sides of the non-active area NA, respectively. However, an additional sensing electrode adjacent to a pad unit PD may have a size smaller than that of the other additional sensing electrodes so as to avoid the connection lines CL.

In an embodiment, the additional sensing electrode 30 may be formed of substantially the same material in the same layer as the first and second sensing electrodes 21 and 22. That is, the additional sensing electrode 30 may be made of a transparent electrode material or a conductive nano compound provided in a mesh form.

The connection lines CL are connected to the first sensing electrodes 21, the second sensing electrodes 22, and the additional sensing electrode 30 in groups of lines to provide a conductive path to the touch controller 40 through the pad unit PD. That is, sensing signals from the first sensing electrodes 21, the second sensing electrodes 22, and the additional sensing electrode 30 may be transmitted to the touch controller 40 through the connection lines CL.

In an embodiment, the connection lines CL may be formed of substantially the same material in the same layer as the first and second sensing electrodes 21 and 22 and the additional sensing electrode 30. The connection lines CL are disposed in the non-active area NA. Since the material of the connection lines CL may be selected from a wide range of materials, the connection lines CL may be formed of not only a transparent electrode material but also a low-resistance metallic material such as molybdenum (Mo), silver (Ag), titanium (Ti), copper (Cu), aluminum (Al), or any alloy thereof. In addition, the connection lines CL may be formed in a single layer or multiple layers. In this case, the outer lines TL may include multiple layers in which two or more of the metallic materials are stacked.

The touch controller 40 determines a touch position, based on a sensing signal corresponding to a driving signal. Here, the driving signal may be an electrical signal for forming capacitance, and the sensing signal may be an electrical signal caused by a change in capacitance. The touch screen apparatus of this embodiment is a touch screen apparatus using an electrostatic capacitance method. If a finger of a user or a contact object such as the active touch pen Apen is in contact with the touch screen apparatus to provide a touch input, a change in capacitance corresponding to the contact position is transmitted from the first and second sensing electrodes 21 and 22 and the additional sensing electrode 30 to the touch controller 40 via the connection lines CL and the pad unit PD. Then, the touch controller 40 may detect a touch position corresponding to the touch input by converting the electrical signal caused by the change in capacitance into digital data.

In a touch mode using the active touch pen Apen, a driving signal may be generated by the active touch pen Apen, and a sensing signal may be provided from the first and second sensing electrodes 21 and 22 and the additional sensing electrode 30. In determination of a touch position, the touch controller 40 determines the touch position, based on the sensing signal provided from the additional sensing electrode 30 located in the non-active area NA in addition to the first and second sensing electrodes 21 and 22 located in the active area AA.

The touch controller 40 determines a touch position by comparing signal intensities of sensing signals from electrodes adjacent to each other. When a touch occurs at a central portion of the active area AA, the touch controller 40 may determine the touch position by comparing sensing signals from the first and second sensing electrodes 21 and 22. However, when a touch occurs at an outer portion of the active area AA, the signal intensities of sensing signals from the first and second sensing electrodes 21 and 22 are weak, and therefore, it is not easy to determine a touch position using only the first and second sensing electrodes 21 and 22. Accordingly, the touch controller 40 determines the touch position by receiving a sensing signal input from the additional sensing electrode 30 located at the outside of the active area AA. Thus, the touch recognition at the periphery of the active area AA can be further accurate.

In an embodiment, referring to FIG. 1B, in which the touch screen apparatus is integrated with a display panel, the first sensing electrodes 21, the second sensing electrodes 22, and the additional sensing electrode (e.g., second additional sensing electrode 32) may be formed on a first substrate 10*a* of the display panel 100.

The display panel 100 may include a seal member 13 sealing the first substrate 10*a* and a second substrate 10*b*, and a pixel unit 15 interposed between the first substrate 10*a* and the second substrate 10*b*. Various examples of display panels known in the art may used for the display panel 100, and a detailed description of the display panel 100, accordingly, is unnecessary.

The active area AA corresponds to a display area in which the pixel unit 15 of the display panel 100 is located, and the non-active area NA corresponds to a non-display area in which the seal member 13 of the display panel 100 is located. Particularly, the non-active area NA may be divided into a first non-active area NA1 in which the connection lines CL are located and a second non-active area NA2 in which the second additional sensing electrode 32 is located.

The second non-active area NA2 is an area in which the second additional sensing electrode 32 and the seal member 13 overlap with each other. When the second additional sensing electrode 32 is formed of a transparent electrode material, the touch screen apparatus integrated with the display panel can be manufactured without interfering with curing of the seal member 13.

In another embodiment, referring to FIG. 1C, the first sensing electrodes 21, the second sensing electrodes 22, and the additional sensing electrode (e.g., second additional sensing electrode) 32 may be formed on a separate touch substrate 10*c*. In addition, the touch substrate 10*c* and the display panel 100 may be coupled to each other by an adhesive layer AL.

For example, the touch substrate 10*c* may be a thin film formed of one or more materials selected from the group consisting of polyethylene terephthalate (PET), polycarbonate (PC), acryl, polymethylmethacrylate (PMMA), triacetyl cellulose (TAC), polyethersulfone (PES), and polyimide (PI). The adhesive layer AL may be formed of one or more materials selected from the group consisting of epoxy resin, acryl resin, silicon, ethylene vinyl acetate (EVA), and polyethylene (PE), but the disclosure is not limited thereto.

Figure 2A:
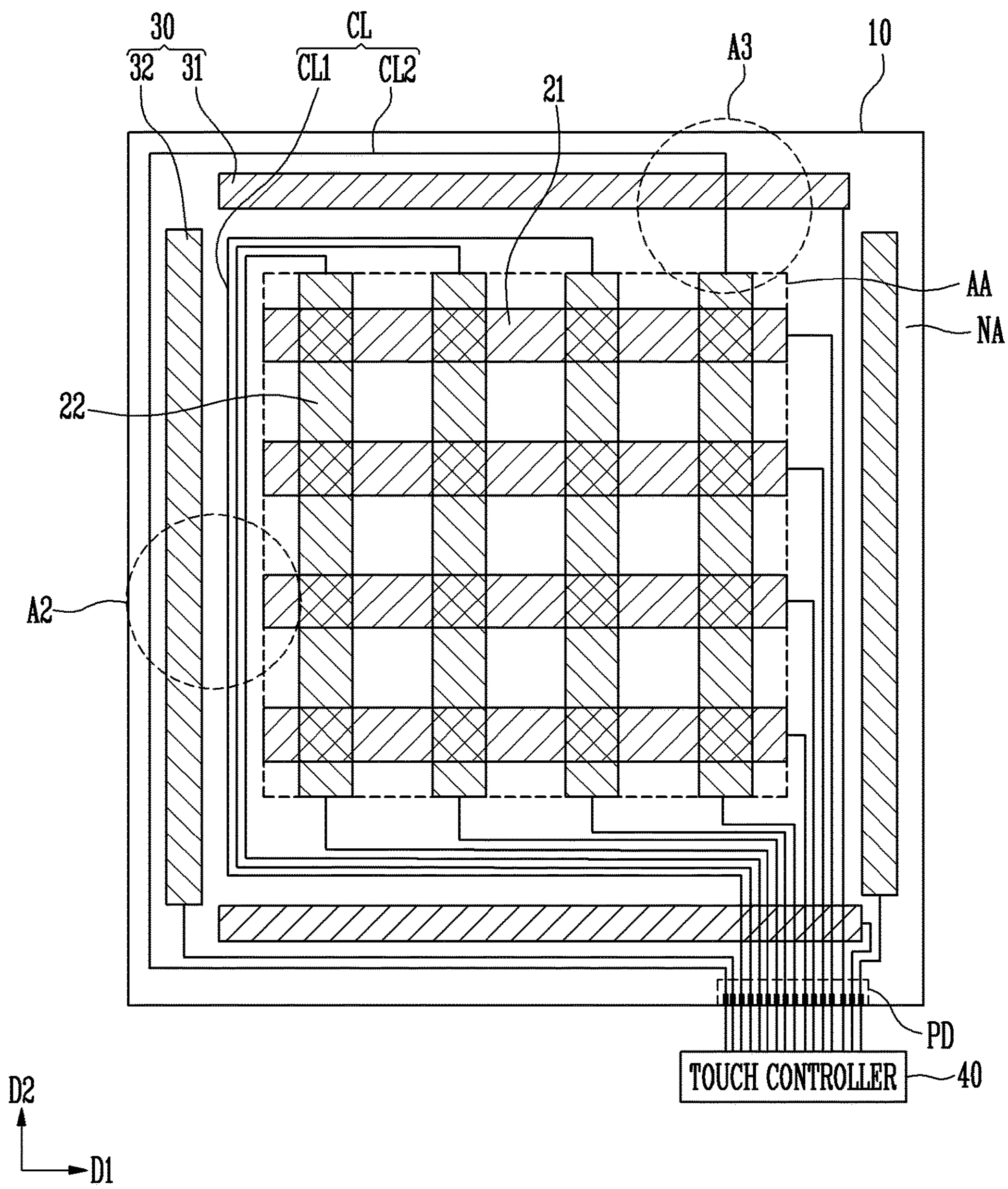
FIG. 2A is a plan view of another exemplary touch screen apparatus constructed according to the principles of the invention.
Figure 2B:
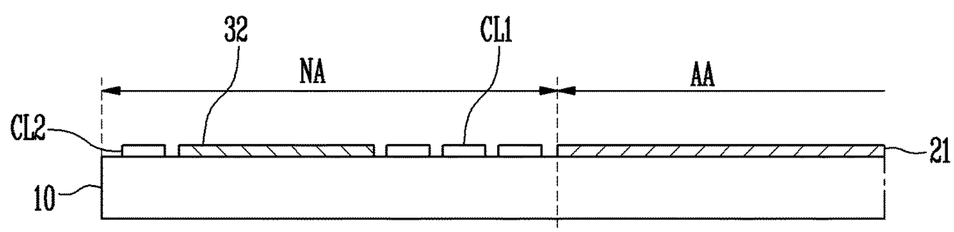
FIG. 2B is a partial cross-sectional view of area A2 of FIG. 2A.
Figure 2C:
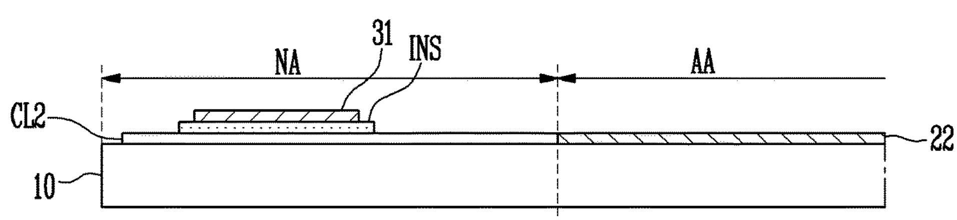
FIG. 2C is a partial cross-sectional view of area A3 of FIG. 2A.

FIG. 2A is a plan view of another exemplary touch screen apparatus constructed according to the principles of the invention. FIG. 2B is a partial cross-sectional view of area A2 of FIG. 2A. FIG. 2C is a partial cross-sectional view of area A3 of FIG. 2A.

Components having the same reference numerals as those described above may refer to the aforementioned disclosure, and repetitive descriptions are not necessary and will be omitted.

Referring to FIGS. 2A, 2B, and 2C, in the touch screen apparatus of this embodiment, an additional sensing electrode 30 is located between connection lines CL. The connection lines CL may include first connection lines CL1 located between the active area AA and the additional sensing electrode 30, and second connection lines CL2 located at the outside of the additional sensing electrode 30. A portion of the additional sensing electrode 30 may overlap with portions of the first connection lines CL1 and the second connection lines CL2. For example, referring to A3 area of FIG. 2A, portions of the second connection lines CL2 may extend through first additional sensing electrodes 31, and referring to FIG. 2C, the portions of the second connection lines CL2 may overlap with the first additional electrodes 31. In addition, referring to the area adjacent to the pad unit PD of FIG. 2A, portions of the first connection lines CL1, which are adjacent to the pad unit PD, may extend through with the first additional sensing electrodes 31 adjacent to the pad unit PD, so that the portions of the first connection lines CL1 may overlap with the first additional electrodes 31 which are adjacent to the pad unit PD.

The connection lines CL may overlap with the additional sensing electrode 30 in a bridge-like manner. For example, referring to FIG. 2C, the second connection line CL2 may have a structure extending over or under the first additional sensing electrode 31. Here, an insulating layer INS may be provided between the first additional sensing electrode 31 and the second connection line CL2, which overlap with each other.

The insulating layer INS may be formed from an organic insulating layer or an inorganic insulating layer. The material of the organic insulating layer may include organic insulating materials including a polyacryl-based compound, a polyimide-based compound, a fluorine-based compound such as Teflon, a benzocyclobutene-based compound, and the like. The material of the inorganic insulating layer may include inorganic insulating materials including polysiloxane, silicon nitride, silicon oxide, and the like.

In addition to the above-described embodiments, the shape, position, and number of the additional electrodes 30 may be changed in various ways, as will be appreciated by the person of ordinary skill in the art.

Figure 3A:
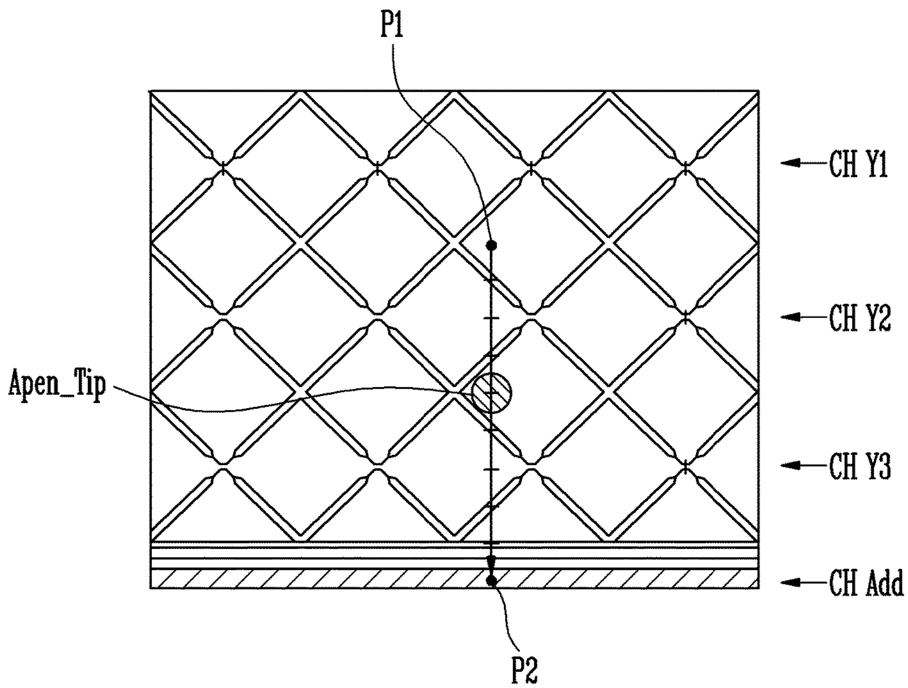
FIGS. 3A and 3B are views illustrating an example in which a touch position is determined at an outer portion of an active area according to the principles of the invention.
Figure 3B:
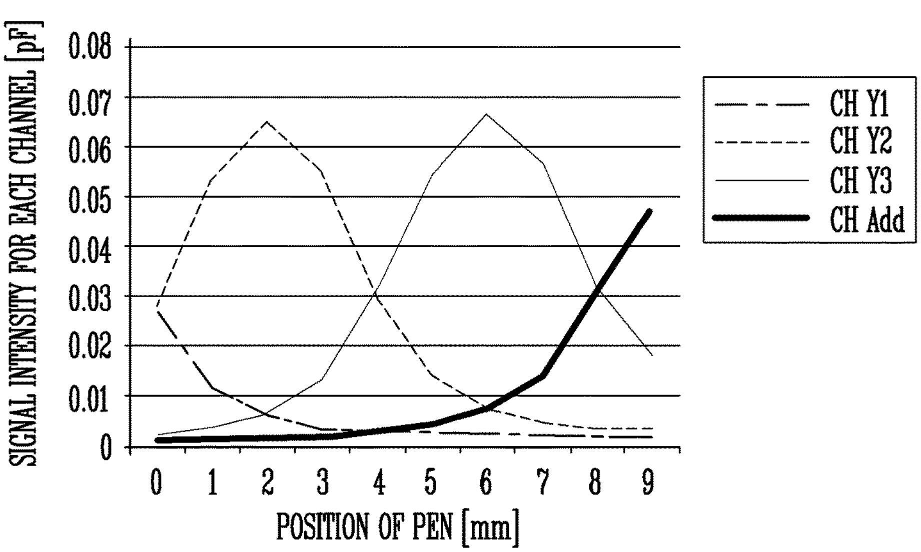

FIGS. 3A and 3B are views illustrating an example in which a touch position is determined at an outer portion of an active area according to the principles of the invention.

FIG. 3A is an enlarged plan view of an outer portion of the touch screen apparatus, which represents an experimental example in which a touch position is determined when a tip Apen_Tip of an active touch pen is moved in a direction from the inside to the outside of the active area AA.

Specifically, a channel for receiving a sensing signal input corresponds to any one electrode. In this experimental example, it is assumed that channels are a Y1 channel CH Y1, a Y2 channel CH Y2, and a Y3 channel CH Y3, which correspond to some of the first sensing electrodes 21, and an additional channel CH Add corresponding to any one additional sensing electrode 30.

Based on a distance between the tip Apen_Tip of the active touch pen and an arbitrary electrode, the signal intensity of a sensing signal input from a channel corresponding to the corresponding electrode is changed. As the signal intensity of the sensing signal becomes larger, the distance between the tip Apen_Tip of the active touch pen and the arbitrary electrode becomes closer.

In this experimental example, the tip Apen_Tip of the active touch pen is moved to a second point P2 spaced from a first point P1 by 9 mm. As the tip Apen_Tip of the active touch pen is moved, the signal intensity of a sensing signal for each channel is changed.

FIG. 3B is a graph related to the experimental example of FIG. 3A. In FIG. 3B, the horizontal axis of the graph represents position of the tip Apen_Tip of the active touch pen, and the vertical axis of the graph represents signal intensity for each channel at a point at which the tip Apen_Tip of the active touch pen is located.

The touch controller 40 determines a touch position by comparing sensing signals for the respective channels as is known in the art. Specifically, the touch controller 40 determines a touch position through relative comparison ratio analysis of signal intensities of sensing signals input from a plurality of channels. In this experimental example, the touch controller 40 determines a touch position by comparing signal intensities of sensing signals input from the Y1 channel CH Y1, the Y2 channel CH Y2, the Y3 channel CH Y3, and the additional channel CH Add.

When the tip Apen_Tip of the active touch pen is located at the inside of the active area AA, the touch controller 40 may determine a touch position by comparing and analyzing sensing signals input from the Y1 channel CH Y1, the Y2 channel CH Y2, and the Y3 channel CH Y3. If the tip Apen_Tip of the active touch pen is moved in a direction toward the outside of the active area AA, it is difficult to compare and analyze sensing signals using only the Y1 channel CH Y1, the Y2 channel CH Y2, and the Y3 channel CH Y3. This is because only the sensing signal of the Y3 channel CH Y3 is intense as the signal intensities of the sensing signals of the Y1 channel CH Y1 and the Y2 channel CH Y2 become very weak.

In the touch screen apparatus of the one or more exemplary embodiments, a touch position is determined by simultaneously analyzing a sensing signal of the additional channel CH Add corresponding to the additional sensing electrode 30 located at the outside of the active area AA, in addition to sensing signals of the channels in the active area AA. Accordingly, the error of touch recognition can be reduced, and the accuracy of touch recognition at an outer portion of the active area AA can be improved.

As described above, according to the principles of the invention, a touch position is determined using at least one additional sensing electrode separated from the first and second sensing electrodes, with the at least one additional sensing electrode being located in the non-active area, so that the accuracy of touch recognition at an outer portion of the active area can be improved.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A touch screen apparatus comprising:

a first substrate having an active area and a non-active area outside the active area;

a second substrate spaced from the first substrate by a seal member;

first sensing electrodes arranged along a first direction in the active area;

second sensing electrodes arranged along a second direction intersecting the first direction in the active area, the second sensing electrodes being insulated from the first sensing electrodes;

at least one first additional sensing electrode arranged along the first direction in the non-active area, and separated from the first and second sensing electrodes;

at least one second additional sensing electrode arranged along the second direction in the non-active area, and separated from the first and second sensing electrodes, the at least one second additional sensing electrode overlapping with the seal member; and connection lines connecting each of the first sensing electrodes, the second sensing electrodes, the at least one first additional sensing electrode, and the at least one second additional sensing electrode to a touch controller, wherein a portion of the at least one first additional sensing electrode overlaps with a portion of at least one of the connection lines, and an insulating layer is provided between the portion of the at least one first additional sensing electrode and the connection lines which overlap each other.

2. The touch screen apparatus of claim 1, further comprising an active touch pen that generates a driving signal for a touch input.

3. The touch screen apparatus of claim 2, wherein the touch controller is configured to a touch position, based on a sensing signal provided from the at least one first and second additional sensing electrodes, the sensing signal corresponding to the driving signal.

4. The touch screen apparatus of claim 1, wherein the at least one second additional sensing electrode is located outwardly from the connection lines.

5. The touch screen apparatus of claim 1, wherein the at least one second additional sensing electrode is located between the connection lines.

6. The touch screen apparatus of claim 1, wherein the first sensing electrodes, the second sensing electrodes, the at least one first additional sensing electrode, and the at least one second additional sensing electrode are formed on the first substrate of a display panel.

7. The touch screen apparatus of claim 6, wherein the active area comprises a display area of the display panel, and the non-active area comprises a non-display area of the display panel.

8. The touch screen apparatus of claim 7, wherein the at least one second additional sensing electrode overlaps with an area in which the seal member is connected to the first substrate and the second substrate.

9. The touch screen apparatus of claim 8, wherein the first sensing electrodes, the second sensing electrodes, the at least one first additional sensing electrode, and the at least one second additional sensing electrode are formed of a transparent electrode material.

10. The touch screen apparatus of claim 1, wherein each of the at least one first additional sensing electrode, and the at least one second additional sensing electrode has a substantially bar-like shape extending along one side of the non-active area.

11. The touch screen apparatus of claim 1, wherein each of the at least one first additional sensing electrode, and the at least one second additional sensing electrode has a width narrower than that of the first and second sensinq electrodes.

12. The touch screen apparatus of claim 1, wherein the at least one first additional sensing electrode and the at least one second additional sensing electrode surround the outer periphery of the active area.

13. The touch screen apparatus of claim 1, wherein the at least one first additional sensing electrode and the at least one second additional sensing electrode substantially surround the outer periphery of the active area.

14. The touch screen apparatus of claim 1, wherein each of the at least one first additional sensing electrode and the at least one second additional sensing electrode is separated from the first and second sensing electrodes in a plan view.

15. A touch screen apparatus comprising:

an active area and a non-active area outside the active area;

first sensing electrodes arranged along a first direction in the active area;

second sensing electrodes arranged along a second direction intersecting the first direction in the active area, the second sensing electrodes being insulated from the first sensing electrodes;

at least one additional sensing electrode located in the non-active area, and separated from the first and second sensing electrodes; and connection lines extending from each of first sensing electrodes, the second sensing electrodes, and the additional sensing electrode, the additional sensing electrode being located between two of the connection line, wherein a portion of the additional sensing electrode overlaps with a portion of at least one of the connection lines, and an insulating layer is provided between the portion of the additional sensing electrode and the connection lines which overlap each other.

* * * * *